United States Patent
Kawai et al.

(10) Patent No.: US 10,650,129 B2
(45) Date of Patent: May 12, 2020

(54) SERVER DEVICE, SERVICE METHOD, PROGRAM, AND NON-TRANSITORY COMPUTER-READABLE INFORMATION RECORDING MEDIUM

(71) Applicant: Rakuten, Inc., Tokyo (JP)

(72) Inventors: Kohei Kawai, Tokyo (JP); Sonny Kurniawan, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/769,240

(22) PCT Filed: May 30, 2016

(86) PCT No.: PCT/JP2016/065917
§ 371 (c)(1),
(2) Date: Apr. 18, 2018

(87) PCT Pub. No.: WO2017/208305
PCT Pub. Date: Dec. 7, 2017

(65) Prior Publication Data
US 2019/0080074 A1 Mar. 14, 2019

(51) Int. Cl.
*H04L 29/00* (2006.01)
*G06F 21/33* (2013.01)
(Continued)

(52) U.S. Cl.
CPC ............ *G06F 21/335* (2013.01); *G06F 21/33* (2013.01); *G06F 21/41* (2013.01); *G06F 21/44* (2013.01);
(Continued)

(58) Field of Classification Search
CPC .................. G06F 21/335; G06F 21/604; G06F 2221/2137; G06F 21/44; G06F 21/41;
(Continued)

(56) References Cited

U.S. PATENT DOCUMENTS

| | | | |
|---|---|---|---|
| 7,421,733 B2 * | 9/2008 | Glassman | G06F 21/31 713/163 |
| 2007/0044146 A1 * | 2/2007 | Murase | G06F 21/33 726/10 |

(Continued)

FOREIGN PATENT DOCUMENTS

JP 2015-201098 A 11/2015

OTHER PUBLICATIONS

Yan et al., "Security challenges in vehicular cloud computing", IEEE Transactions on Intelligent Transportation Systems, vol. 14, Issue: 1, Mar. 2013.*

(Continued)

*Primary Examiner* — Morshed Mehedi
(74) *Attorney, Agent, or Firm* — Sughrue Mion, PLLC

(57) ABSTRACT

A server device (100) receives access from an application (31) running on a terminal device (200). The server device (100) authenticates the application (31) of the terminal device (200) with a user name and a password and if successful, transmits an access token to the application (31) and approves access. Issuing an access token, the server device (100) postpones the expiration date given to other access tokens associated with the terminal device (200). When an access token received from the application (31) of the terminal device (200) is associated with the terminal device (200) and stored as being unexpired, the server device (100) approves access from the application (31) and postpones the expiration dates given to all access tokens associated with the terminal device (200).

8 Claims, 8 Drawing Sheets

(51) Int. Cl.
  *H04L 29/06* (2006.01)
  *H04L 9/32* (2006.01)
  *G06F 21/44* (2013.01)
  *G06F 21/41* (2013.01)
  *H04W 12/06* (2009.01)
  *G06F 21/60* (2013.01)

(52) U.S. Cl.
  CPC .............. *G06F 21/604* (2013.01); *H04L 9/32* (2013.01); *H04L 63/083* (2013.01); *H04L 63/0807* (2013.01); *H04L 63/0815* (2013.01); *H04L 63/0853* (2013.01); *H04L 63/102* (2013.01); *H04L 63/108* (2013.01); *H04W 12/06* (2013.01); *G06F 2221/2137* (2013.01)

(58) Field of Classification Search
  CPC ..... G06F 21/33; H04L 63/108; H04L 63/102; H04L 63/0853; H04L 63/083; H04L 63/0815; H04L 63/0807; H04L 9/32; H04W 12/06
  See application file for complete search history.

(56) References Cited

U.S. PATENT DOCUMENTS

| | | | | |
|---|---|---|---|---|
| 2009/0015371 | A1* | 1/2009 | Bocquet | G07C 9/00 340/5.2 |
| 2015/0089569 | A1* | 3/2015 | Sondhi | H04L 63/08 726/1 |
| 2016/0028737 | A1* | 1/2016 | Srinivasan | H04L 63/0807 726/1 |
| 2017/0111292 | A1* | 4/2017 | Zhao | H04L 47/822 |
| 2017/0223005 | A1* | 8/2017 | Birgisson | H04L 63/083 |

OTHER PUBLICATIONS

Ke et al., "Process abstraction and its applications in transportation systems", 6th IEEE International Conference on Industrial Informatics, Date of Conference: Jul. 13-16, 2008.*

International Search Report for PCT/JP2016/065917 dated Aug. 30, 2016.

* cited by examiner

| USER NAME | PASSWORD |
|---|---|
| taro | ciud6be2d |
| user123 | password |
| hana | xns8r3dc |

FIG.5

| ACCESS TOKEN | | APPLICATION ID | USER NAME | EXPIRATION DATE | TERMINAL IDENTIFICATION CODE |
|---|---|---|---|---|---|
| KEY | AUTHENTICATION CHARACTER STRING | | | | |
| 20012 | 4d7aujemcu3x | 502383716 | taro | 2016.8.21 | 2033419312 |
| 20013 | vsr42ldcd6dl | 823731793 | user123 | 2016.8.14 | 2285482245 |
| 20014 | x3kqynhgz58s | 654019126 | taro | 2016.9.2 | 2033419312 |

22

SERVER DEVICE, SERVICE METHOD, PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2016/065917 filed May 30, 2016.

TECHNICAL FIELD

The present disclosure relates to a server device, a service method, a program, and a non-transitory computer-readable information recording medium.

BACKGROUND ART

Recently, widespread use of so-called smartphones has led to increase in use of services with user-operated terminal devices accessing server devices set up by service providers. When services are provided in such a mode, authentication is required in some cases in order for the servicer device to identify the user.

Generally, for authentication, a mode is used in which a terminal device transmits to a server device a sign-in request specifying a user name and a password (sign-in). In another mode, an access token is used for eliminating the task of entering a user name and a password when a service is provided again to a terminal device once authenticated with the sign-in request. The access token is recorded in the terminal device and transmitted by the terminal device to the server device for authentication when the user requests a service.

For example, Patent Literature 1 discloses a technique regarding an authentication method using access tokens. According to the technique of the Patent Literature 1, the authorizing server issues an access token to a grantee of the access right in response to a request from a granter of the access right. The grantee of the access right can be authenticated using the issued access token. The technique of the Patent Literature 1 intends to enable access to information permitted by the granter without referring to credit information of the granter (his own user name and password).

CITATION LIST

Patent Literature

Patent Literature 1: Unexamined Japanese Patent Application Kokai Publication No. 2015-201098.

SUMMARY OF INVENTION

Technical Problem

However, the above-described technique cannot reduce the user workload required for authentication in an environment where multiple applications run on one and the same terminal device.

In an environment where multiple applications run on one and the same terminal device, sharing of memory among applications is often restricted. Particularly, important information such as one used in authentication is not permitted to share with other applications in most cases from the viewpoint of security. In such a case, for using multiple applications with the same account information on one and the same terminal device, the user has to enter authentication information for each application. Therefore, the workload of the user for authentication is increased.

The present disclosure is made with the view of the above problem. In other words, an objective of the disclosure is to reduce the user workload required for authentication when services are provided by a server device to one and the same terminal device on which multiple applications run.

Solution to Problem

In order to achieve the above objective, the server device according to a first exemplary aspect of the present disclosure is a server device receiving access from multiple applications running on a terminal device, wherein each of the multiple applications asks a user to enter a user name and a password and transmits a sign-in request specifying the entered user name and password to the server device when an access token issued to the application is not stored in a nonvolatile storage region reserved for the application by the terminal device, and transmits to the server device an access request specifying the access token issued to the application when the access token is stored in the nonvolatile storage region, and the server device performs authentication with the user name and password specified in the sign-in request when the sign-in request transmitted by any of the applications running on the terminal device is received, issues the access token associated with the user name specified in the sign-in request to a transmission source application having transmitted the sign-in request if the authentication is successful, transmits the issued access token to the transmission source application, and approves access from the transmission source application, stores the issued access token in association with a terminal identification code presenting the terminal device on which the transmission source application having transmitted the sign-in request runs and with an addition of an expiration date, and postpones expiration dates given to other access tokens stored in association with the terminal identification code, and approves access from a transmission source application having transmitted the access request and postpones expiration dates given to all access tokens stored in association with the terminal identification code of the terminal device on which the transmission source application runs when the access request transmitted by any of the applications running on the terminal device is received and the access token specified in the access request is stored in association with the terminal identification code and as being unexpired.

The above server device according to a first exemplary aspect may order the transmission source application to transmit the sign-in request when the access token specified in the received access request is not stored or is past the stored expiration date.

The above server device according to a first exemplary aspect may store the issued access token in association with a combination of the terminal identification code and the user name specified in the sign-in request and with an addition of the expiration date, and transmit the user name included in the combination including the terminal identification code to the transmission source application and orders the transmission source application to transmit the sign-in request when the access token specified in the received access request is stored in association with the terminal identification code of the terminal device on which the transmission source application having transmitted the access request runs and as being expired.

The above server device according to a first exemplary aspect may be as follows:

when the access token specified in the received access request is stored in association with the terminal identification code of the terminal device on which the transmission source application having transmitted the access request runs and as being unexpired and the expiration date of the access token issued to the transmission source application is postponed to a first expiration date, expiration dates given to all access tokens issued to others of the applications and stored in association with the terminal identification code are postponed to the first expiration date.

The above server device according to a first exemplary aspect may be as follows:

when the access token specified in the received access request is stored in association with the terminal identification code of the terminal device on which the transmission source application having transmitted the access request runs and as being unexpired and the expiration date of the access token issued to the transmission source application is postponed by a first period, expiration dates given to all access tokens issued to others of the applications and stored in association with the terminal identification code are postponed by the first period.

The above server device according to a first exemplary aspect may be as follows:

when the access token specified in the received access request is stored in association with the terminal identification code of the terminal device on which the transmission source application having transmitted the access request runs and as being unexpired and a term of validity of the access token issued to the transmission source application is extended so that a remaining term of validity of the access token is extended by a first multiplying factor compared to before extension, terms of validity given to all access tokens issued to others of the applications and stored in association with the terminal identification code are extended so that remaining terms of validity are extended by the first multiplying factor compared to before extension.

In order to achieve the above objective, the service method according to a second exemplary aspect of the present disclosure is a service method by a server device receiving access from multiple applications running on a terminal device, wherein each of the multiple applications asks a user to enter a user name and a password and transmits a sign-in request specifying the entered user name and password to the server device when an access token issued to the application is not stored in a nonvolatile storage region reserved for the application by the terminal device, and transmits to the server device an access request specifying the access token issued to the application when the access token is stored in the nonvolatile storage region, and the server device performs authentication with the user name and password specified in the sign-in request when the sign-in request transmitted by any of the applications running on the terminal device is received, issues the access token associated with the user name specified in the sign-in request to a transmission source application having transmitted the sign-in request if the authentication is successful, transmits the issued access token to the transmission source application, and approves access from the transmission source application, stores the issued access token in association with a terminal identification code presenting the terminal device on which the transmission source application having transmitted the sign-in request runs and with an addition of an expiration date, and postpones expiration dates given to other access tokens stored in association with the terminal identification code, and approves access from a transmission source application having transmitted the access request and postpones expiration dates given to all access tokens stored in association with the terminal identification code of the terminal device on which the transmission source application runs when the access request transmitted by any of the applications running on the terminal device is received and the access token specified in the access request is stored in association with the terminal identification code and as being unexpired.

In order to achieve the above objective, the program according to a third exemplary aspect of the present disclosure is a program executed by a computer receiving access from multiple applications running on a terminal device, wherein each of the multiple applications asks a user to enter a user name and a password and transmits a sign-in request specifying the entered user name and password to the computer when an access token issued to the application is not stored in a nonvolatile storage region reserved for the application by the terminal device, and transmits to the computer an access request specifying the access token issued to the application when the access token is stored in the nonvolatile storage region, and the program makes the computer execute:

a sign-in authentication procedure to perform authentication with the user name and password specified in the sign-in request when the sign-in request transmitted by any of the applications running on the terminal device is received;

an approval procedure to issue the access token associated with the user name specified in the sign-in request to a transmission source application having transmitted the sign-in request if the authentication is successful, transmit the issued access token to the transmission source application, and approve access from the transmission source application;

a first extension procedure to store the issued access token in association with a terminal identification code presenting the terminal device on which the transmission source application having transmitted the sign-in request runs and with an addition of an expiration date, and postpone expiration dates given to other access tokens stored in association with the terminal identification code;

an access request authentication procedure to approve access from a transmission source application having transmitted the access request when the access request transmitted by any of the applications running on the terminal device is received and the access token specified in the access request is stored in association with the terminal identification code of the terminal device on which the transmission source application runs and as being unexpired; and a second extension procedure to postpone expiration dates given to all access tokens stored in association with the terminal identification code of the terminal device on which the transmission source application having transmitted the access request runs when the access token specified in the received access request is stored in association with the terminal identification code and as being unexpired.

In order to achieve the above objective, the non-transitory computer-readable information recording medium according to a fourth exemplary aspect of the present disclosure is a non-transitory computer-readable information recording medium on which a program executed by a computer receiving access from multiple applications running on a terminal device is recorded, wherein each of the multiple applications asks a user to enter a user name and a password and transmits a sign-in request specifying the entered user name and password to the computer when an access token issued to the application is not stored in a nonvolatile storage region reserved for the application by the terminal device, and transmits to the computer an access request specifying the access token issued to the application when the access token is stored in the nonvolatile storage region, and the program makes the computer execute:

a sign-in authentication procedure to perform authentication with the user name and password specified in the sign-in request when the sign-in request transmitted by any of the applications running on the terminal device is received;

an approval procedure to issue the access token associated with the user name specified in the sign-in request to a transmission source application having transmitted the sign-in request if the authentication is successful, transmit the issued access token to the transmission source application, and approve access from the transmission source application;

a first extension procedure to store the issued access token in association with a terminal identification code presenting the terminal device on which the transmission source application having transmitted the sign-in request runs and with an addition of an expiration date, and postpone expiration dates given to other access tokens stored in association with the terminal identification code;

an access request authentication procedure to approve access from a transmission source application having transmitted the access request when the access request transmitted by any of the applications running on the terminal device is received and the access token specified in the access request is stored in association with the terminal identification code of the terminal device on which the transmission source application runs and as being unexpired; and a second extension procedure to postpone expiration dates given to all access tokens stored in association with the terminal identification code of the terminal device on which the transmission source application having transmitted the access request runs when the access token specified in the received access request is stored in association with the terminal identification code and as being unexpired.

Advantageous Effects of Invention

The present disclosure can reduce the user workload required for authentication when services are provided by a server device to one and the same terminal device on which multiple applications run.

BRIEF DESCRIPTION OF DRAWINGS

FIG. 4 is a chart showing contents of data recorded on the user/password correspondence DB;

FIG. 5 is a chart showing contents of data recorded on the access token DB;

DESCRIPTION OF EMBODIMENTS

An embodiment of the present disclosure will be described below with reference to the drawings.

Embodiment

A server device 100 according to an embodiment of the present disclosure is a server device providing services to a user via applications running on a terminal device operated by the user. The server device 100 determines whether an application running on the terminal device can be provided with a service (authentication) and provides the service only when the application is authenticated as a service being providable.

Figure 1:
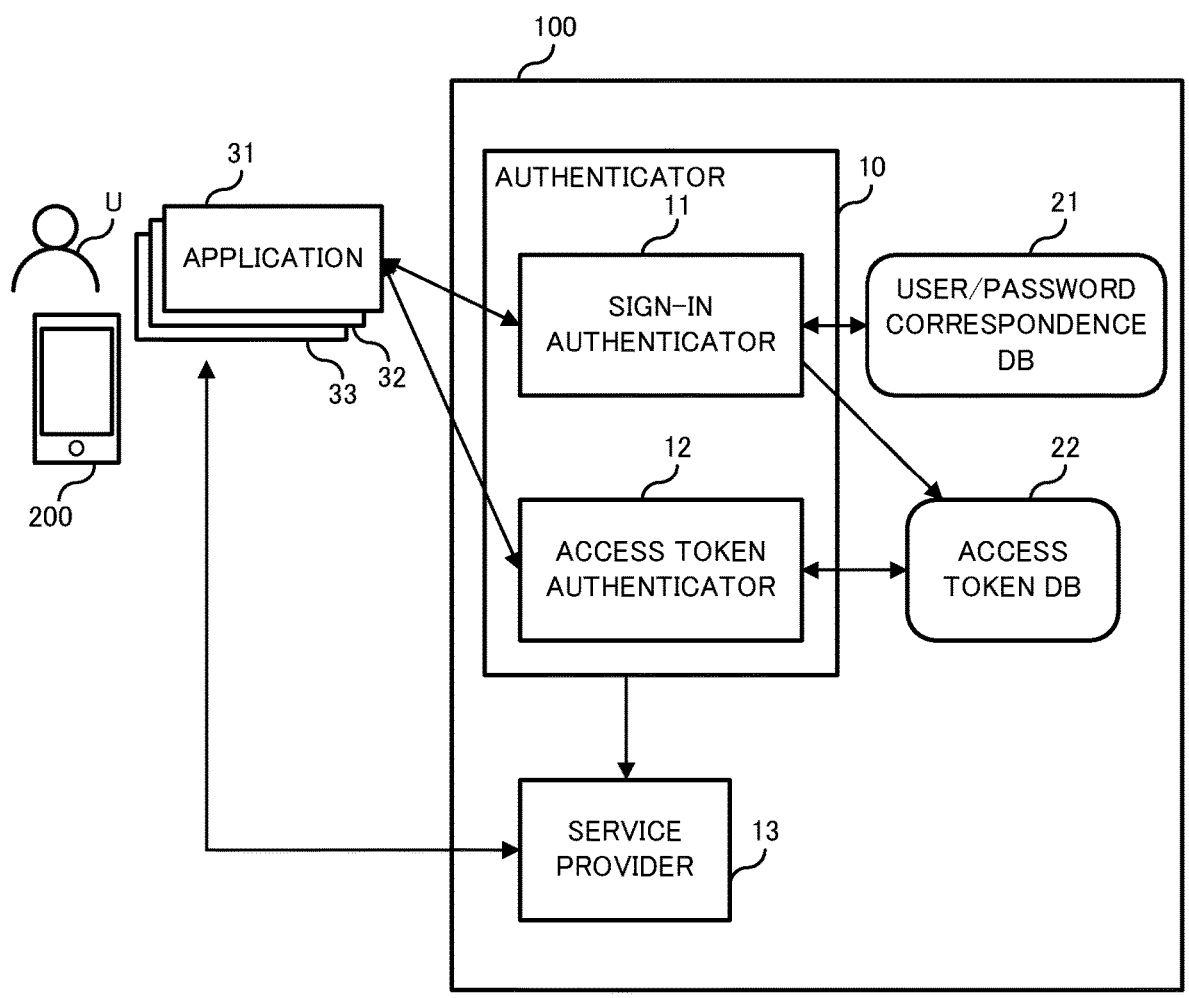
FIG. 1 is a block diagram showing the functional configuration of the server device according to an embodiment.

The server device 100 comprises, as shown in FIG. 1, an authenticator 10 and a service provider 13. The authenticator 10 is a functioner receiving an authentication request from an application running on a terminal device 200 operated by a user U and performing authentication to determine whether a service is providable. Moreover, the service provider 13 is a functioner providing a service to the user U via an application 31 authenticated by the authenticator 10.

The authenticator 10 comprises a sign-in authenticator 11 and an access token authenticator 12 as the functioner to authenticate the application 31.

The sign-in authenticator 11 receives from the application 31 a sign-in request specifying a user name and a password. The sign-in authenticator 11 authenticates the application 31 when the combination of the user name and the password included in the received sign-in request is recorded on a user/password correspondence DB 21.

After authenticating the transmission source application having transmitted the sign-in request (the application 31), the sign-in authenticator 11 issues an access token to the application and records the access token on an access token DB 22. The sign-in authenticator 11 transmits the issued access token to the transmission source application (the application 31). The application 31 records the transmitted access token.

For using a service provided by the server device 100, if an access token is stored in a nonvolatile storage region for the application 31 in the terminal device 200, the application 31 transmits an access request specifying the stored access token. On the other hand, if no access token is stored in the nonvolatile storage region, the application 31 requests the user U to enter a user name and a password. As the user U enters a user name and a password in response to the request, the application 31 transmits a sign-in request specifying the entered user name and password to the server device 100.

The access token authenticator 12 receives an access request specifying an access token from the application 31. If the access token included in the received access request is recorded on the access token DB 22 in association with a terminal identification code presenting the transmission source terminal device (the terminal device 200), the access token authenticator 12 authenticates the application 31.

As described above, the server device 100 authenticates the application 31 by the combination of the sign-in authenticator 11 and the access token authenticator 12. The application 31 running on the terminal device 200 asks the server device 100 for authentication with an access token when an access token is recorded, and asks the server device 100 for authentication with a user name and a password entered by the user U when no access token is recorded. Therefore, the user U is asked to type in when no access token is recorded (in other words, there is no record of authentication). On the other hand, the recorded access token is used for authentication and typing of the user U is omitted when an access token is recorded (in other words, there is a record of authentication). Therefore, the workload of the user U required for authentication can be reduced.

The access token is data comprising a key and an authentication character string as described later. The key is an identification number uniquely given by the server device 100 as information presenting an access token. The authentication character string is a character string given by the server device 100 for indicating that the access token is rightful. Generally, the server device 100 gives a random character string generated under specific conditions as an access token authentication character string.

The server device 100 manages the access tokens recorded on the access token DB 22 with the addition of expiration dates. In other words, even with an application (or a terminal device) once authenticated and having an access token issued, the access token expires unless the application (the terminal device) is authenticated by a given expiration date. As the access token expires, the user has to enter a user name and a password for authentication by sign-in in order to receive the service from the server device 100 with the application or the terminal device associated with the access token.

Moreover, when the server device 100 authenticates an application (and a terminal device) with an access request including an access token, the server device 100 postpones the expiration date of the access token. Therefore, as the user repeatedly receives a service from the server device 100 via the application before the expiration date (in other words, being authenticated with an access token), the user can continuously receive the service from the server device 100 without entering a user name and a password.

The terminal device 200 can run applications other than the application 31. When the terminal device 200 runs applications 32 and 33 using the same server device 100, the server device 100 can authenticate the applications 31, 32, and 33 with the same user account (authentication with the combination of the same user name and password). In other words, if the server device 100 has authenticated a sign-in request transmitted by the application 31 and then a sign-in request specifying the same set of a user name and a password as the user name and the password specified in that sign-in request is transmitted by the application 32, the server device 100 authenticates the application 32.

Authenticating an application, the sign-in authenticator 11 issues an access token. The sign-in authenticator 11 records the issued access token on the access token DB 22 and transmits the issued access token to the authenticated application. The transmitted access token is recorded in a non-volatile storage region reserved for the application by the terminal device 200 for each authenticated application. In other words, even if multiple applications are authenticated with the same user account (the applications 31, 32, and 33), the server device 100 issues access tokens to the applications individually. The applications 31, 32, and 33 each record their issued access token.

The terminal device 200 does not allow sharing of information regarding authentication (a user name, a password, an access token) among applications to run. This is because information regarding authentication is very important information in terms of security and it is intended to reduce the risk of such important information leaking. Therefore, the application 31 cannot be authenticated with reference to the access token recorded in the application 32.

On the other hand, the server device 100 uses common data (the user/password correspondence DB 21 and the access token DB 22) for authenticating multiple applications. Therefore, when the server device 100 is accessed by the application 31 running on the terminal device 200, the server device 100 can access information regarding the access tokens of applications running on the same terminal device 200 (the applications 32 and 33).

Specifically, as the server device 100 authenticates a sign-in request from the application 31 via the sign-in authenticator 11, the server device 100 records an access token on the access token DB 22 in association with a terminal identification code presenting the terminal device on which the application 31 runs (the terminal device 200) and with the addition of an expiration date. In other words, the access token is recorded on the access token DB 22 along with the information presenting the terminal device 200.

As the server device 100 authenticates a sign-in request from the application 31, the server device 100 extracts an access token issued to an application running on the terminal device 200 that is the same terminal device as the application 31 and recorded on the access token DB 22, and postpones the expiration date of the extracted access token. Specifically, the server device 100 identifies the access tokens transmitted to the applications 32 and 33 from the access token DB 22 and updates the accompanying expiration dates to later dates/times.

Moreover, as the server device 100 authenticates an access request from the application 31, the server device 100 extracts an access token issued to an application running on the terminal device 200 and recorded on the access token DB 22, and postpones the expiration date of the extracted access token. Specifically, the server device 100 identifies the access tokens transmitted to the applications 31, 32, and 33 from the access token DB 22 and updates the accompanying expiration dates to later dates/times.

Comprising the above-described configuration, the server device 100 authenticates applications running on the terminal device 200 (the applications 31, 32, and 33) and provides services to the authenticated applications. Even if there is no authentication request (a sign-in request or an access request) from the application 31 for a long time, as long as an authentication request is made by the application 32 running on the terminal device 200 that is one and the same terminal device before the expiration date of the access token, the expiration date of the access token issued to the application 31 is postponed. Therefore, it is possible to reduce the user workload required for authentication when services are provided by a server device to one and the same terminal device on which multiple applications run.

Figure 2:
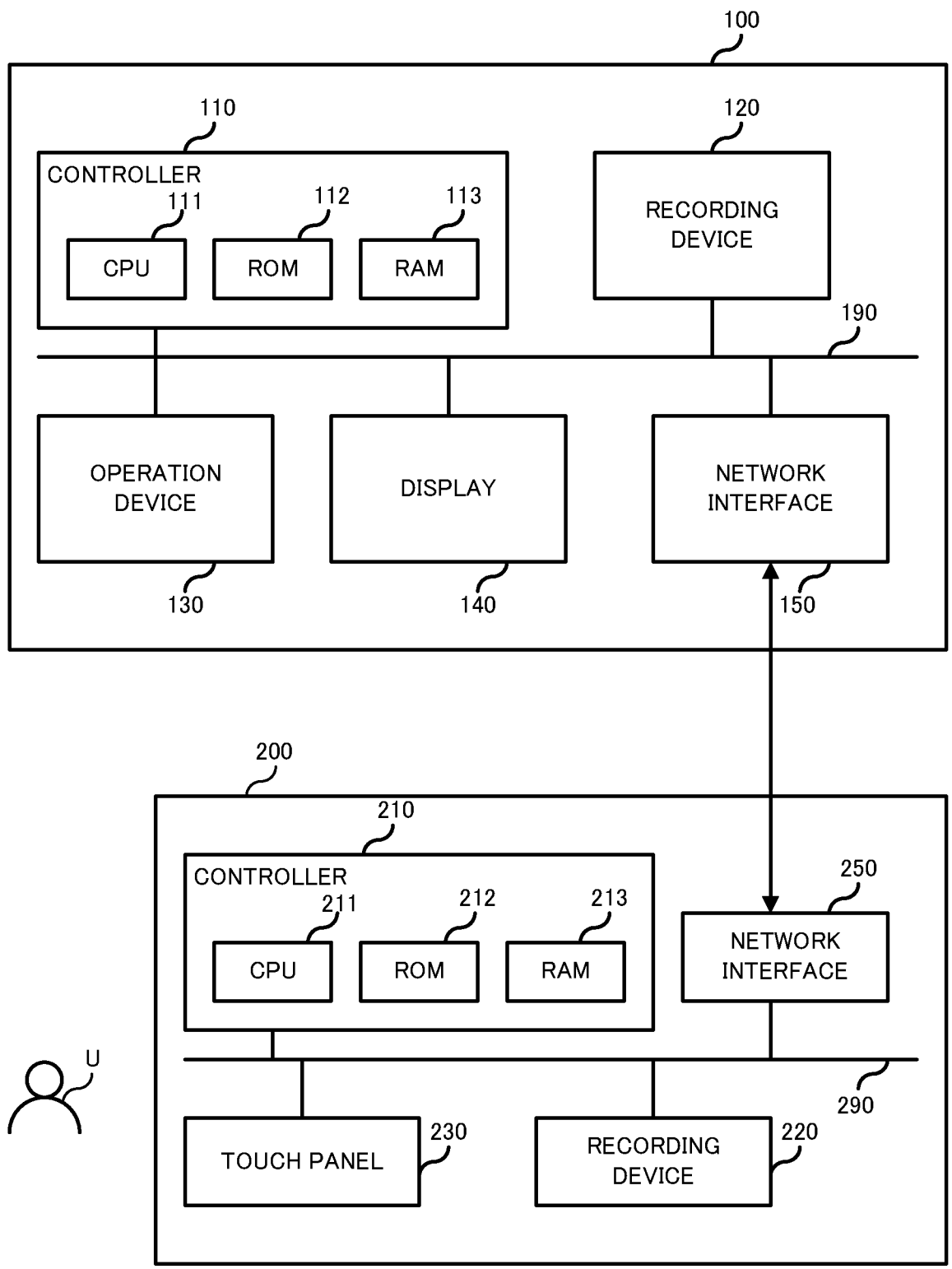
FIG. 2 is a block diagram showing the hardware configurations of the server device and the terminal device.

The server device 100 according to this embodiment comprises as hardware, as shown in FIG. 2, a controller 110, a recording device 120, an operation device 130, a display 140, and a network interface 150. These are mutually connected by an internal bus 190.

The controller 110 comprises a central processing unit (CPU) 111, a read only memory (ROM) 112, a random access memory (RAM) 113, and the like. As the CPU of the controller 110 executes programs recorded in the ROM or the RAM, the controller 110 controls the entire operation of the server device 100. The controller 110 reads data such as programs from the recording device 120 as necessary and saves data in the recording device 120.

The recording device 120 comprises a recording device such as a hard disk drive and a flash memory, and stores data necessary for the server device 100 to operate.

The operation device 130 comprises a keyboard, a mouse, and the like, and receives input operations by the user U and conveys the input operations to the controller 110.

The display 140 comprises a liquid crystal display or a cathode-ray tube monitor, and displays information necessary for the user of the server device 100.

The network interface 150 connects the server device 100 to a network.

When the server device 100 transmits information to other devices or receives information from other devices via a network, the network interface 150 transmits information received from the controller 110 via the internal bus 190 described later to other devices via a network, and transmits information received from other devices via a network to the controller 110 via the internal bus 190. For example, the server device 100 transmits/receives data to/from the terminal device 200 operated by the user U via the network interface 150. The user U is authenticated and receives services via the terminal device 200 connected to the server device 100 via a network.

The terminal device 200 to which the server device 100 provides services comprises as hardware, as shown in FIG. 2, a controller 210, a recording device 220, a touch panel 230, and a network interface 250. These are mutually connected by an internal bus 290.

The controller 210 comprises a CPU 211, a ROM 212, a RAM 213, and the like. As the CPU of the controller 210 executes programs recorded in the ROM or the RAM, the controller 210 controls the entire operation of the terminal device 200.

The recording device 220 comprises a recording device such as a hard disk drive and a flash memory, and stores data necessary for the terminal device 200 to operate.

The touch panel 230 is an electronic device in which a display capable of displaying information and a position detection device detecting a touched point are combined. The touch panel 230 receives input operations by the user U by means of the position detection device and conveys the input operations to the controller 210. Moreover, the touch panel 230 displays information necessary for the user U by means of the display.

The network interface 250 connects the terminal device 200 to a network. Particularly, the terminal device 200 transmits/receives data to/from the server device 100 via the network interface 250.

Figure 3:
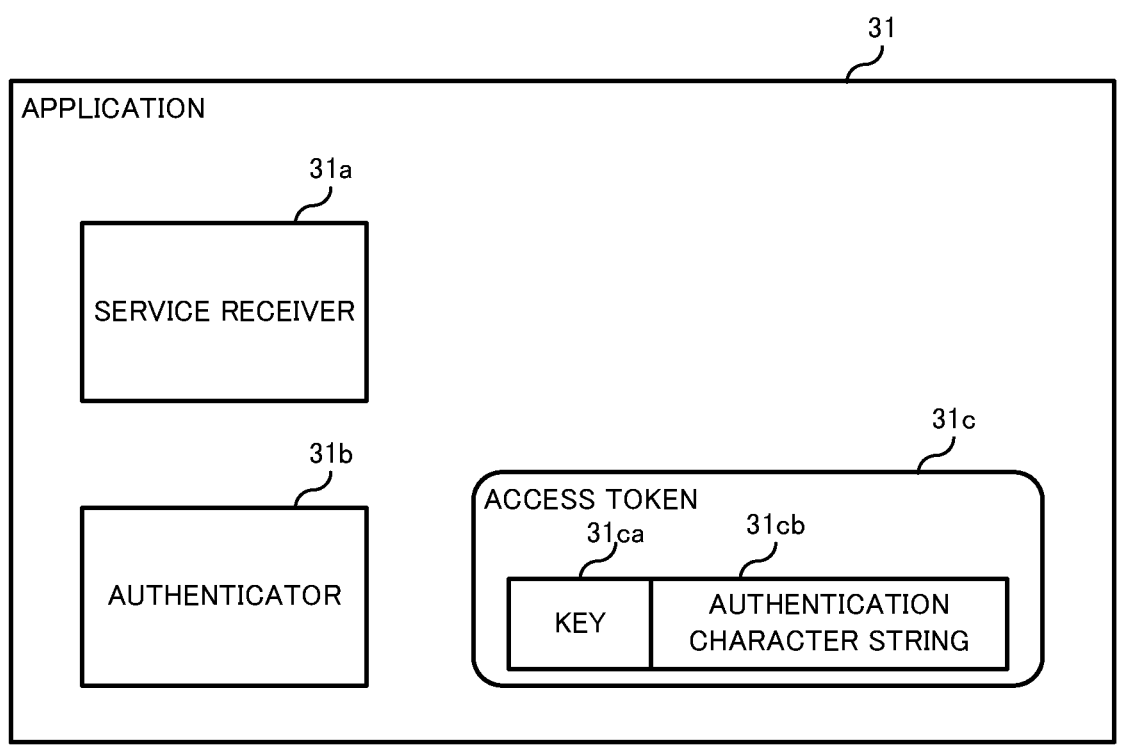
FIG. 3 is a block diagram showing the functional configuration of an application run by the terminal device.

The application 31 run by the terminal device 200 comprises components shown in FIG. 3. In other words, the application 31 comprises, as functioners, a service receiver 31$a$ receiving a service from the service provider 13 of the server device 100 and an authenticator 31$b$ undergoing authentication by the server device 100. Furthermore, the application 31 records an access token 31$c$ in a nonvolatile storage region of the terminal device 200 that is assigned to the application 31. The access token 31$c$ comprises a key 31$ca$ and an authentication character string 31$cb$.

The key 31$ca$ is identification information uniquely given by the server device 100 for identifying the access token.

The authentication character string 31$cb$ is a character string issued by the server device 100 in association with the key so that the access token is not wrongfully used. In generating an access token, the server device 100 generates a key serving as identification information as unique information and adds to the key a random character string generated under specific conditions to generate an access token.

The access token is issued and managed by the server device 100 on the application basis. As the authenticator 31$b$ makes a sign-in request using a user name and a password and the sign-in request is approved, the application 31 records an access token transmitted by the server device 100 with no change. The application 31 records and transmits the access token 31$c$ but does not correct data.

Since the server device 100 issues access tokens on the application basis, the application 31 and the application 32 each uniquely record an access token. In other words, the access token recorded by the application 31 and the access token recorded by the application 32 are independently recorded and their contents are not the same.

The application 31 may not record data regarding authentication other than the access token 31$c$. If the access token 31$c$ is not recorded or the recorded access token 31$c$ is not valid, the application 31 asks the user to enter a user name and a password and transmits the entered user name and password to the server device 100. However, the transmitted user name and password will not be referred to afterward.

The server device 100 records data shown in FIG. 4 on the user/password correspondence DB 21. In other words, the server device 100 records user names and passwords associated with the user names on the user/password correspondence DB 21.

Here, in FIG. 4, character strings presenting the passwords are shown as they are. However, it is desirable to record on the user/password correspondence DB 21 the character strings presenting the passwords (or information corresponding thereto) in a format ensuring security. For example, character strings generated by encrypting the character strings of the passwords entered by the users may be recorded on the user/password correspondence DB 21. In such a case, for determining whether a character string entered by the user matches the set password, the server device 100 decodes an encrypted password recorded on the user/password correspondence DB 21 and determines whether the character string entered by the user matches the set password.

Alternatively, hash values of the passwords entered by the users may be recorded on the user/password correspondence DB 21. In such a case, for recording information corresponding to a character string presenting a password, the server device 100 records on the user/password correspondence DB 21 information generated by using a hash function based on the character string presenting the password. For determining whether a character string entered by the user matches the set password, the server device 100 determines whether information generated by using a hash function based on the character string entered by the user matches information recorded on the user/password correspondence DB 21. Furthermore, the server device 100 may record on the user/password correspondence DB 21 information generated by using a hash function based on a character string obtained by adding a character string called a salt to a character string set by the user as a password (a hash value) in association with the salt.

The server device 100 records data shown in FIG. 5 on the access token DB 22. The server device 100 records on the access token DB 22 information such as an access token including a key and an authentication character string, an application ID that is an identification number presenting an application, a user name, an expiration date given to the access token, and a terminal identification code presenting a terminal device.

In FIG. 5, the authentication character string of an access token is a random string of 12 characters comprising 12 alphanumeric characters. However, this is not restrictive and longer random character strings may be used as the authentication character string.

Authenticating an application by sign-in, the server device 100 issues an access token and records the access token on the access token DB 22. Moreover, in doing so, the server device 100 records an application ID presenting the transmission source application having requested the sign-in authentication, a user name authenticated by the sign-in, and a terminal identification code of the terminal device on which the transmission source application runs in association with the access token. Furthermore, upon authentication, the server device 100 gives an expiration date to the access token and records the given expiration date on the access token DB 22.

Figure 6:
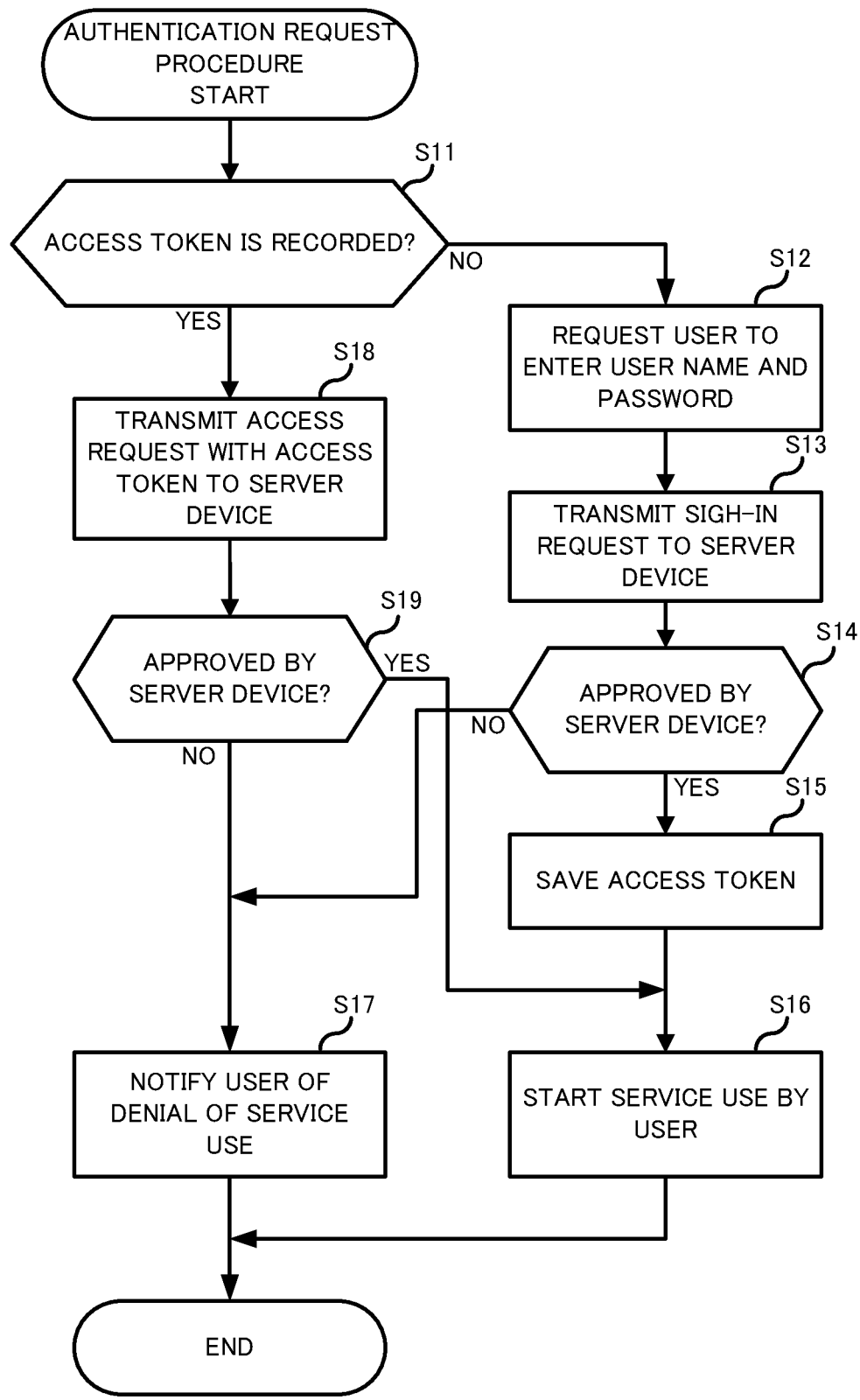
FIG. 6 is a flowchart showing the authentication request procedure by the terminal device.

The authentication request procedure that is the first procedure to be executed when the application 31 starts on the terminal device 200 will be described with reference to FIG. 6. As the user U conducts a start operation, the application 31 starts the authentication request procedure.

First, the application 31 determines whether an access token is recorded in the nonvolatile storage region assigned to the application 31 in the terminal device 200 (Step S11).

If determined that no access token is recorded in the Step S11 (Step S11: NO), the application 31 requests the user to enter a user name and a password (Step S12). The application 31 displays a form to enter a user name and a password and urges the user to type in via the touch panel 230 of the terminal device 200.

As the user enters a user name and a password, the application 31 transmits a sign-in request to the server device 100 (Step S13). The application 31 transmits to the server device 100 a sign-in request specifying the user name and password entered by the user.

Then, the application 31 determines whether access is approved by the server device 100 (Step S14). The application 31 receives a signal transmitted by the server device 100 in response to the transmitted sign-in request and determines whether the received signal indicates approval of access or denial of access.

If determined that access is approved by the server device 100 in the Step S14 (Step S14: YES), the application 31 saves an access token (Step S15). When the server device 100 approves access in response to a sign-in request, the server device 100 transmits to the application 31 an access token in addition to the signal indicating approval of access as described above. The application 31 receives the access token transmitted by the server device 100 and records the access token in the nonvolatile storage region.

Subsequently, the application 31 starts use of a service by the user (Step S16). The application 31 connects to the service provider 13 of the server device 100 via the service receiver 31a. From then on, while continuing use of the service from the server device 100 by the user U, the application 31 ends the authentication request procedure.

If determined that access is not approved by the server device 100 in the Step S14 (Step S14: NO), notice of denial of service use is given to the user (Step S17). When the server device 100 does not approve access in response to a sign-in request, the server device 100 transmits a signal indicating denial of access to the application 31. Receiving the signal indicating denial of access from the server device 100, the application 31 notifies the user U of denial of service provision (unsuccessful authentication). Finishing the Step S17, the application 31 ends the authentication request procedure.

On the other hand, if determined that an access token is recorded in the Step S11 (Step S11: YES), the application 31 transmits an access request with the recorded access token to the server device 100 (Step S18). The application 31 transmits to the server device 100 the recorded access token with the addition of a terminal identification code presenting the terminal device 200.

Then, the application 31 determines whether access is approved by the server device 100 (Step S19). The application 31 receives a signal transmitted by the server device 100 in response to the transmitted access request and determines whether the received signal indicates approval of access or denial of access.

If determined that access is approved by the server device 100 in the Step S19 (Step S19: YES), the application 31 shifts the processing to the above-described Step S16 and starts use of a service by the user (Step S16). The application 31 connects to the service provider 13 of the server device 100 via the service receiver 31a. From then on, while continuing use of the service from the server device 100 by the user U, the application 31 ends the authentication request procedure.

If determined that access is not approved by the server device 100 in the Step S19 (Step S19: NO), the application 31 shifts the processing to the above-described Step S17 and notifies the user of denial of service use (Step S17). When the server device 100 does not approve access in response to an access request, the server device 100 transmits a signal indicating denial of access to the application 31. Receiving the signal indicating denial of access from the server device 100, the application 31 notifies the user U of denial of service provision (unsuccessful authentication). Finishing the Step S17, the application 31 ends the authentication request procedure.

Executing the above-described authentication request procedure, the terminal device 200 transmits a sign-in request or an access request to the server device 100 and starts using a service only when access is approved. The authentication procedure (the sign-in request authentication procedure and the access request authentication procedure) executed by the server device 100 for dealing with the authentication request procedure of the terminal device 200 will be described hereafter.

Figure 7:
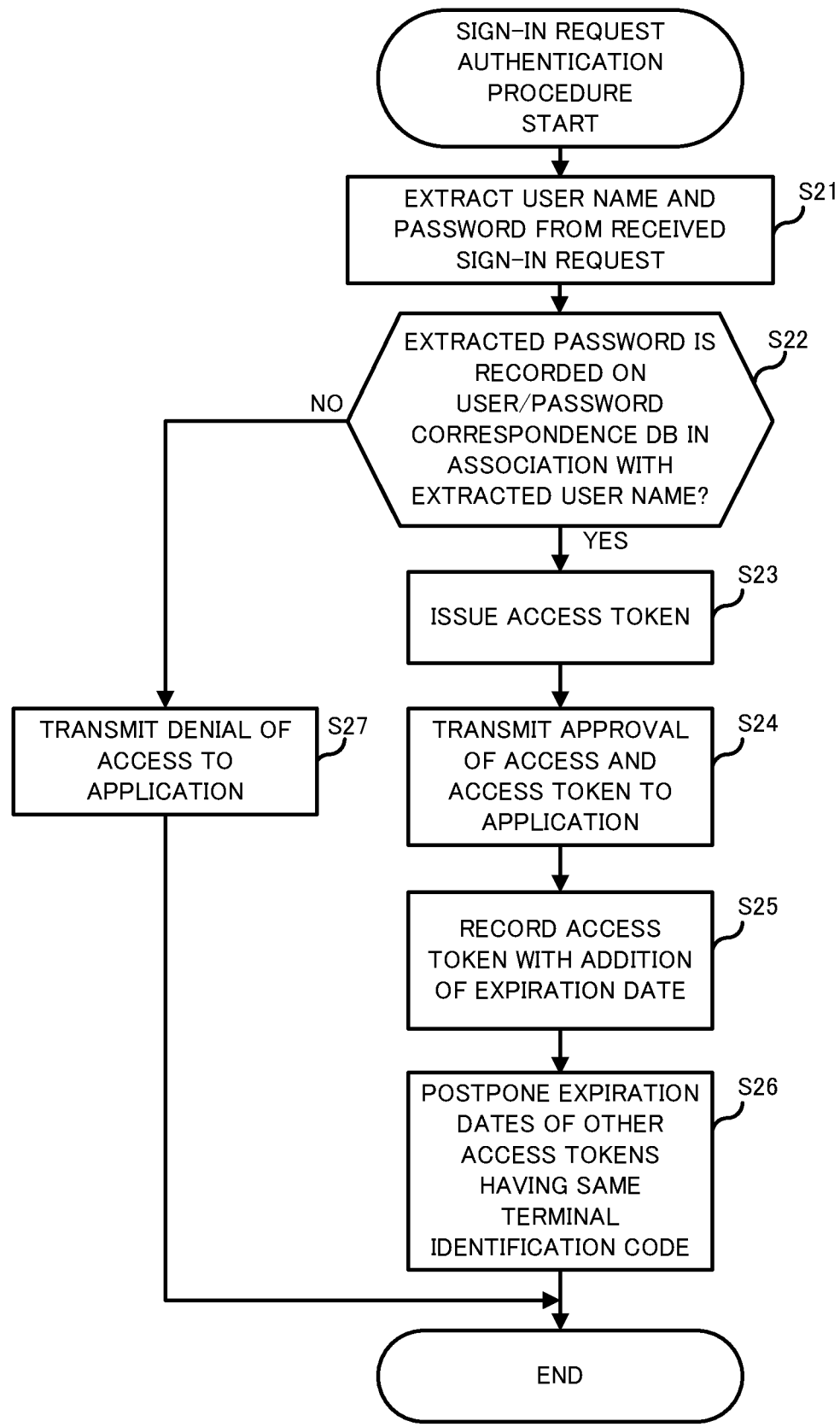
FIG. 7 is a flowchart showing the sign-in request authentication procedure.

Receiving a sign-in request from the application 31, the server device 100 starts the sign-in request authentication procedure shown in FIG. 7.

At the beginning of the sign-in request authentication procedure, the server device 100 extracts a user name and a password from the received sign-in request (Step S21). The server device 100 extracts a user name and a password from the received sign-in request and identifies them as the user mane and the password specified by the sign-in request.

Then, the server device 100 determines whether the extracted password is recorded on the user/password correspondence DB 21 in association with the extracted user name (Step S22). The server device 100 searches the user/password correspondence DB 21 based on the extracted user name and determines whether the password recorded in association with the extracted user name matches the extracted password.

If determined that the extracted password is not recorded in association with the extracted user name in the Step S22 (Step S22: NO), the server device 100 transmits denial of access to the application 31 (Step S27). Subsequently, the server device 100 ends the sign-in request authentication procedure.

On the other hand, if determined that the extracted password is recorded in association with the extracted user name in the Step S22 (Step S22: YES), the server device 100 issues an access token (Step S23). The server device 100 generates and concatenates a key and an authentication character string of an access token and issues the access token.

Then, the server device 100 transmits to the application 31 approval of access and the issued access token (Step S24). The server device 100 transmits to the application 31 a signal indicating approval of access and the access token issued in the Step S23.

Then, the server device 100 records the issued access token with the addition of an expiration date (Step S25). The server device 100 concatenates and records on the access token DB 22 as a single record the issued access token, information presenting the expiration date, an application ID presenting the application 31, and a terminal identification code presenting the terminal device on which the application 31 runs (the terminal device 200).

Then, the server device 100 postpones the expiration dates of other access tokens having the same terminal identification code (Step S26). The server device 100 reads all records in which the terminal identification code of the terminal device 200 is recorded from the access token DB 22. The server device 100 postpones the recorded expiration dates in the records other than the record recorded in the Step S25 among the read records. Finishing the Step S26, the server device 100 ends the sign-in request authentication procedure.

The authentication procedure when the server device 100 receives a sign-in request from the application 31 is described above. The authentication procedure when the server device 100 receives an access request with an access token from the application 31 will be described hereafter with reference to FIG. 8. Receiving an access request from the application 31, the server device 100 starts the access request authentication procedure shown in FIG. 8.

At the beginning of the access request authentication procedure, the server device 100 identifies the terminal identification code of the terminal device that is the transmission source of the received access request (Step S31). The server device 100 extracts a terminal identification code presenting the transmission source terminal device (the terminal device 200) from the access request.

Then, the server device 100 extracts an access token from the received access request (Step S32). The server device 100 extracts a part corresponding to an access token from the received access request.

Then, the server device 100 determines whether the extracted access token is recorded validly on the access token DB 22 (Step S33). The server device 100 reads from the access token DB 22 the access token extracted in the Step S32 and determines whether the expiration date given to the access token is past. The server device 100 determines that the extracted access token is not recorded validly on the access token DB 22 (1) when the extracted access token is not recorded on the access token DB 22 or (2) when the extracted access token is recorded on the access token DB 22 but has expired.

If determined that the extracted access token is not recorded validly on the access token DB 22 in the Step S33 (Step S33: NO), the server device 100 transmits denial of access to the application 31 (Step S36). Subsequently, the server device 100 ends the access request authentication procedure.

On the other hand, if determined that the extracted access token is recorded validly on the access token DB 22 in the Step S33 (Step S33: YES), the server device 100 transmits approval of access to the application 31 (Step S34). The server device 100 transmits a signal indicating approval of access to the application 31.

Then, the server device 100 postpones the expiration dates of all access tokens having the terminal identification code identified in the Step S31 (Step S35). The server device 100 reads from the access token DB 22 all records in which the terminal identification code identified in the Step S31 is recorded. The server device 100 postpones the recorded expiration dates in all read records. Finishing the Step S35, the server device 100 ends the access request authentication procedure.

As the server device 100 authenticates the application 31 by the above-described two authentication procedures (the sign-in request authentication procedure and the access request authentication procedure), the server device 100 postpones the expiration dates of the access tokens of the applications 32 and 33 running on the same terminal device as the application 31 (the terminal device 200). As a result, input of a user name and a password can be eliminated when the user U receives a service with the application 32 or 33.

In this embodiment, the expiration dates of access tokens are managed by the server device 100 and thus, information does not need to be shared by applications running on the terminal device 200. Therefore, even in an environment where sharing of memory among applications is restricted in the terminal device 200 and the application 31 and the application 32 cannot access the same data, the server device 100 can postpone the expiration date of the access token issued to the application 32 along with authentication of the application 31.

An embodiment of the present disclosure is described above. The present disclosure is not restricted to the above-described contents. For example, the following modifications can be made.

Figure 8:
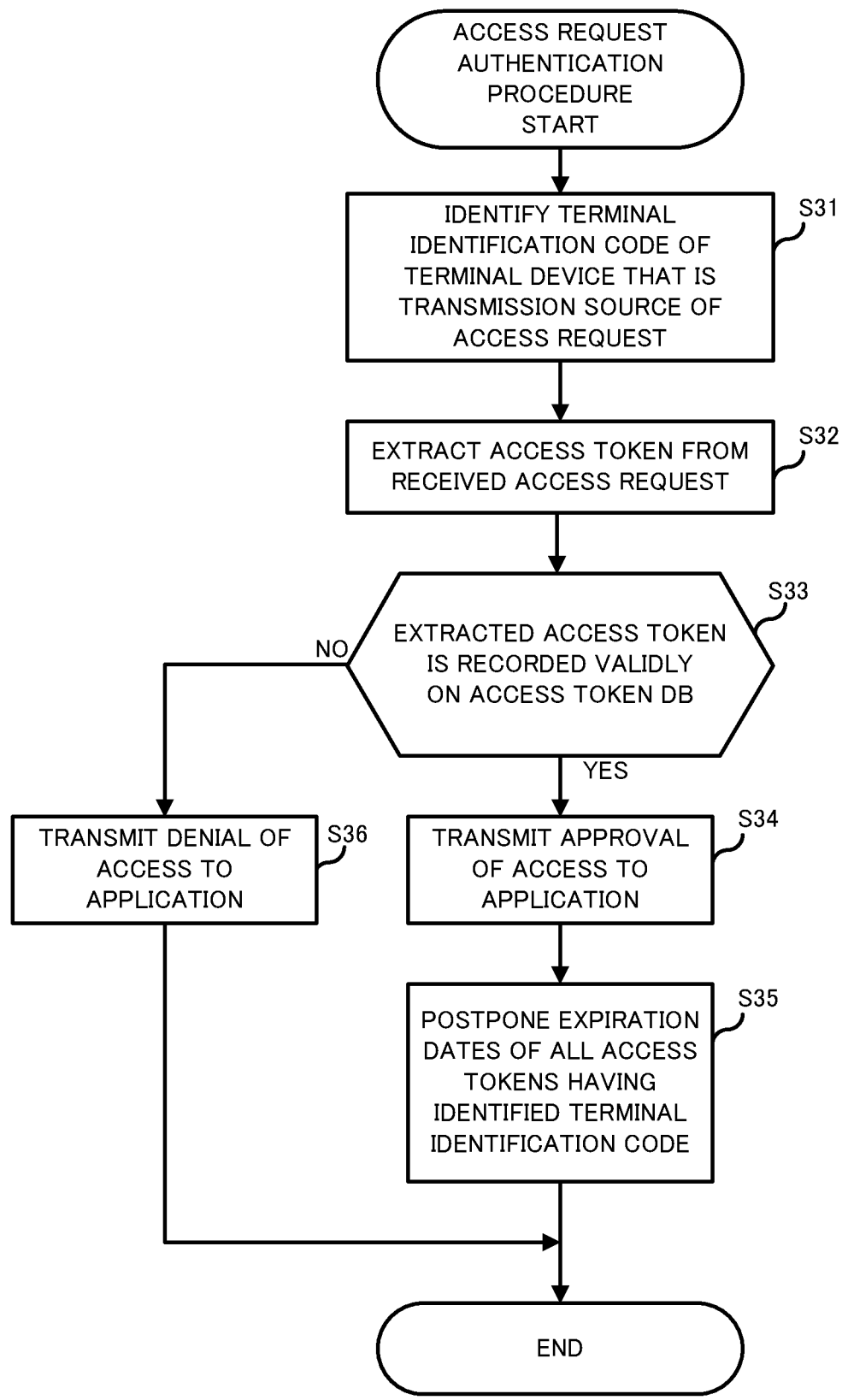
FIG. 8 is a flowchart showing the access request authentication procedure.

In the access request authentication procedure shown in FIG. 8, if determined that the access token is not recorded validly on the access token DB 22 in the Step S33, the server device 100 transmits denial of access to the application 31 (Step S36) and ends the procedure. However, the server device 100 may not only simply deny access but also order the transmission source application 31 to transmit a sign-in request.

The application 31 does not handle information regarding the expiration date of a recorded access token and thus retains the access token as it is after the access token has expired. Then, when the application 31 transmits an expired access token to the server device 100, the server device 100 orders the application 31 to transmit a sign-in request, thereby notifying the application 31 that the retained access token is already invalid. The application 31 deletes the recorded access token, askes the user to enter a user name and a password, and transmits to the server device 100 a sign-in request specifying the entered user name and password. Authenticated with the sign-in request, the application 31 can receive a valid access token from the server device 100.

Moreover, in giving an order to transmit a sign-in request, the server device 100 may extract a user name from the record presenting the access token on the access token DB 22 (when the access token is recorded as being expired), and transmit the extracted user name to the application 31. Presenting the received user name in asking the user to enter a user name and a password, the terminal device 200 can suggest the user with which user name the user should sign in.

When an access request (or a sign-in request) from the application 31 is authenticated, the server device 100 according to this embodiment postpones the expiration date of an access token issued to another application (the application 32) running on the same terminal device (the terminal device 200). In regard to this, the expiration date can be postponed in any mode.

For example, it is assumed that the server device 100 authenticates an access request from the application 31 and postpones the expiration date given to the access token issued to the application 31 by a first period, and as a result the expiration date given to the application 31 is set to a first expiration date. Moreover, it is assumed that the remaining term of validity of the access token issued to the application 31 before extension is a second period. Then, the server device 100 may postpone the expiration date of the access token issued to the application 32 by the following methods:

(1) setting the expiration date for the same date/time as the new expiration date of the access token issued to the application 31 (the first expiration date);

(2) postponing the expiration date by a period corresponding to the period by which the access token issued to the application 31 is postponed (the first period); or (3) provided that the term of validity given to the access token issued to the application 31 is extended by the server device 100 by a first multiplying factor (the first multiplying factor=(the first period+the second period)/the second period), extending the term so that the remaining term of validity is extended by the first multiplying factor compared to before extension.

As an example of the above method (1), it is assumed that the server device 100 gives a new expiration date Mar. 31, 2016 to the access token issued to the application 31. In such a case, the server device 100 gives the same date/time (Mar. 31, 2016) to the access token issued to the application 32 as the expiration date.

As an example of the above method (2), it is assumed that the server device 100 postpones the expiration date of the access token issued to the application 31 by 10 days. In such a case, the server device 100 postpones the expiration date of the access token issued to the application 32 by the same period (10 days).

As an example of the above method (3), it is assumed that the remaining term of validity of the access token issued to the application 31 before extension is five days and the server device 100 extends the term by 10 days. In such a case, the server device 100 extends the term of validity of the access token issued to the application 31 by a multiplying factor of 3 (=15/5). When the remaining term of validity of the access token issued to the application 32 before extension is seven days, the server device 100 extends the term of validity by 14 days so that the remaining term of validity is extended by a multiplying factor of 3 compared to before extension.

The server device according to the embodiment of the present disclosure can be realized also by a conventional computer system, not by a dedicated system. For example, the programs for realizing the above operations may be stored and distributed on a non-transitory computer-readable recording medium such as a flexible disc, a compact disk read only memory (CD-ROM), a digital versatile disk (DVD), and a magneto-optical disk (MO) and installed on a computer system to configure a source program analysis system executing the above-described procedures. Furthermore, the programs may be stored in a disk unit or the like of a server device on the Internet and, for example, superimposed on carrier waves and downloaded on a computer.

Moreover, the server device according to the embodiment of the present disclosure is not necessarily realized by a single device. Multiple computers may take charge of some of the above-described functions and provide the functions as a single system comprising the multiple computers.

This detailed description, therefore, is not to be taken in a limiting sense, and the scope of the invention is defined only by the included claims, along with the full range of equivalents to which such claims are entitled.

REFERENCE SIGNS LIST

10 Authenticator
11 Sign-in authenticator
12 Access token authenticator
13 Service provider
21 User/password correspondence DB
22 Access token DB
31 Application
31*a* Service receiver
31*b* Authenticator
31*c* Access token
32 Application
33 Application
100 Server device
110 Controller
111 CPU
112 ROM
113 RAM
120 Recording device
130 Operation device
140 Display
150 Network interface
190 Internal bus
200 Terminal device
210 Controller
211 CPU
212 ROM
213 RAM
220 Recording device
230 Touch panel
250 Network interface
290 Internal bus
U User

The invention claimed is:

1. A device configured to receive access from multiple applications running on a terminal device, comprising:
   at least one memory configured to store computer program code; and
   at least one processor configured to access the computer program code and operate as instructed by the computer program code, the computer program code configured to:

when a first access token that is an access token to one of the multiple applications is stored in a nonvolatile storage region of the terminal device, receive, from the one of the multiple applications, an access request specifying the first access token and when the first access token is not stored in the nonvolatile storage region, receive, from the one of the multiple applications, a sign-in request specifying a user name and a password;

perform authentication with the user name and password specified in the sign-in request when the sign-in request transmitted by the one of the multiple applications running on the terminal device is received;

based on the determining that the authentication is successful, issue the first access token to a transmission source application having transmitted the sign-in request, transmit the issued first access token to the transmission source application, and approve access from the transmission source application;

store the issued first access token in association with a terminal identification code identifying the terminal device on which the transmission source application having transmitted the sign-in request runs, with an addition of an expiration date, and postpone an expiration date to a second access token stored in association with the terminal identification code, the second access token being an access token different from the first access token; and approve access from a transmission source application having transmitted the access request and postpone expiration dates to the first access token specified in the access request and the second access token stored in association with the terminal identification code of the terminal device on which the transmission source application runs when the access request transmitted by the one of the multiple applications running on the terminal device is received and the first access token specified in the access request is stored in association with the terminal identification code and as being unexpired.

2. The server device according to claim 1, wherein the computer program code is further configured to order
the transmission source application to transmit the sign-in request when the first access token specified in the received access request is not stored or is past the stored expiration date.

3. The server device according to claim 2, wherein the computer program code is further configured to:
store the issued first access token in association with a combination of the terminal identification code and the user name specified in the sign-in request and with an addition of the expiration date, and
transmit the user name included in the combination including the terminal identification code to the transmission source application and order the transmission source application to transmit the sign-in request when the first access token specified in the received access request is stored in association with the terminal identification code of the terminal device on which the transmission source application having transmitted the access request runs and as being expired.

4. The server device according to claim 1, wherein the computer program code is further configured to:
when the first access token specified in the received access request is stored in association with the terminal identification code of the terminal device on which the transmission source application having transmitted the access request runs and as being unexpired and the expiration date to the first access token to the transmission source application is postponed to a first expiration date, postponed the expiration date to the second access token stored in association with the terminal identification code to the first expiration date.

5. The server device according to claim 1, wherein
the computer program code is further configured to:
when the first access token specified in the received access request is stored in association with the terminal identification code of the terminal device on which the transmission source application having transmitted the access request runs and as being unexpired and the expiration date to the first access token to the transmission source application is postponed by a first period, postponed the expiration date to the second access token stored in association with the terminal identification code, by the first period.

6. The server device according to claim 1, wherein
the computer program code is further configured to:
when the first access token specified in the received access request is stored in association with the terminal identification code of the terminal device on which the transmission source application having transmitted the access request runs and as being unexpired and a term of validity of the first access token to the transmission source application is extended so that a remaining term of validity of the first access token is extended by a first multiplying factor, extend a term of validity of the second access token stored in association with the terminal identification code so that a remaining term of validity of the second access token is extended, by the first multiplying factor.

7. A method of receiving access from multiple applications running on a terminal device, the method performed by a server device comprising,
when a first access token that is an access token to one of the multiple applications is stored in a nonvolatile storage region of the terminal device receiving, from the one of the multiple applications, an access request specifying the first access token and when the first access token is not stored in the nonvolatile storage region, receiving, from the one of the multiple applications, a sign-in request specifying a user name a password;

performing authentication with the user name and password specified in the sign-in request when the sign-in request transmitted by the one of the multiple applications running on the terminal device is received;

based on determining that the authentication is successful, issuing the first access token to a transmission source application having transmitted the sign-in request, transmitting the issued first access token to the transmission source application, and approving access from the transmission source application;

storing the issued first access token in association with a terminal identification code identifying the terminal device on which the transmission source application having transmitted the sign-in request runs with an addition of an expiration date, and postponing an expiration date to a second access token stored in association with the terminal identification code, the second access token being an access token different from the first access token; and approving access from a transmission source application having transmitted the access request and postponing the expiration dates to the first access token specified in the access request and the second access token stored in association with the terminal identification code of the terminal device on which the transmission source application runs when the access request transmitted by the one of the multiple applications running on the terminal device is received and the access token specified in the access request is stored in association with the terminal identification code and as being unexpired.

8. A non-transitory computer-readable information recording medium on which a program executed by a computer configured to receive access from multiple applications running on a terminal device is recorded, the program causing the computer to:

when a first access token that is an access token to one of the multiple applications is stored in a nonvolatile storage region of the terminal device, receive, from the one of the multiple applications, an access request specifying the first access token and when the first access token is not stored in the nonvolatile storage region, receive, from the one of the multiple applications, a sign-in request specifying a user name and a password, perform authentication with the user name and password specified in the sign-in request when the sign-in request transmitted by the one of the multiple applications running on the terminal device is received;

based on determining that the authentication is successful, issue the first access token to a transmission source application having transmitted the sign-in request, transmit the issued first access token to the transmission source application, and approve access from the transmission source application;

store the issued first access token in association with a terminal identification code identifying the terminal device on which the transmission source application having transmitted the sign-in request runs, with an addition of an expiration date, and postpone an expiration date to a second access token stored in association with the terminal identification code, the second access token being an access token differrent from the first access token; and approve access from a transmission source application having transmitted the access request and postpone expiration dates to the first access token specified in the access request and the second access token stored in association with the terminal identification code of the terminal device on which the transmission source application runs when the access request transmitted by the one of the multiple applications running on the terminal device is received and the first access token specified in the access request is stored in association with the terminal identification code and as being unexpired.

* * * * *